J. W. TAYLOR.
TRUCK.
APPLICATION FILED SEPT. 21, 1909.
977,759.
Patented Dec. 6, 1910.
2 SHEETS—SHEET 1.
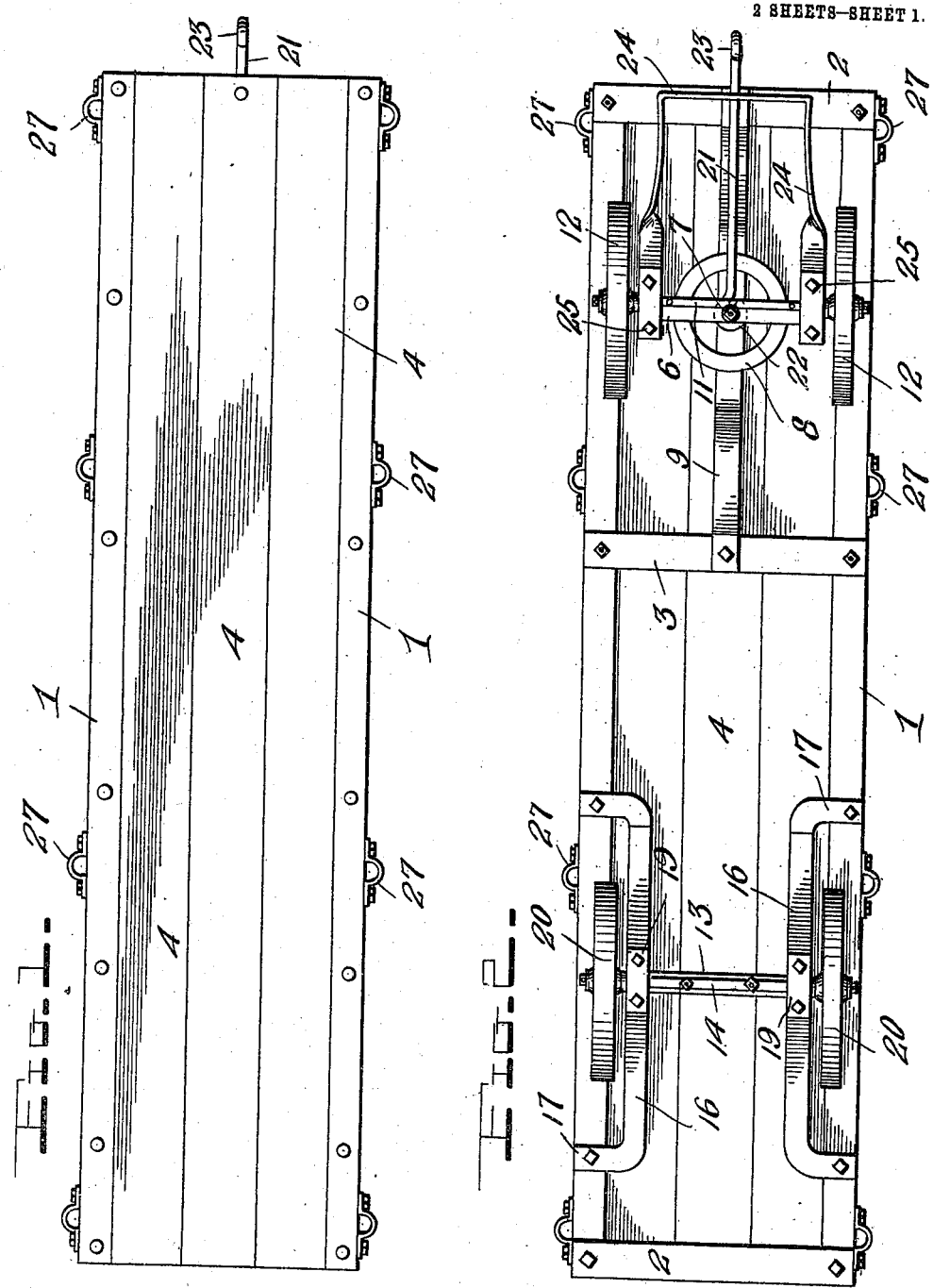
Witnesses
Chas. L. Griesbauer.
C. H. Griesbauer.
Inventor
J. W. Taylor
by H. B. Willson & Co.
Attorneys

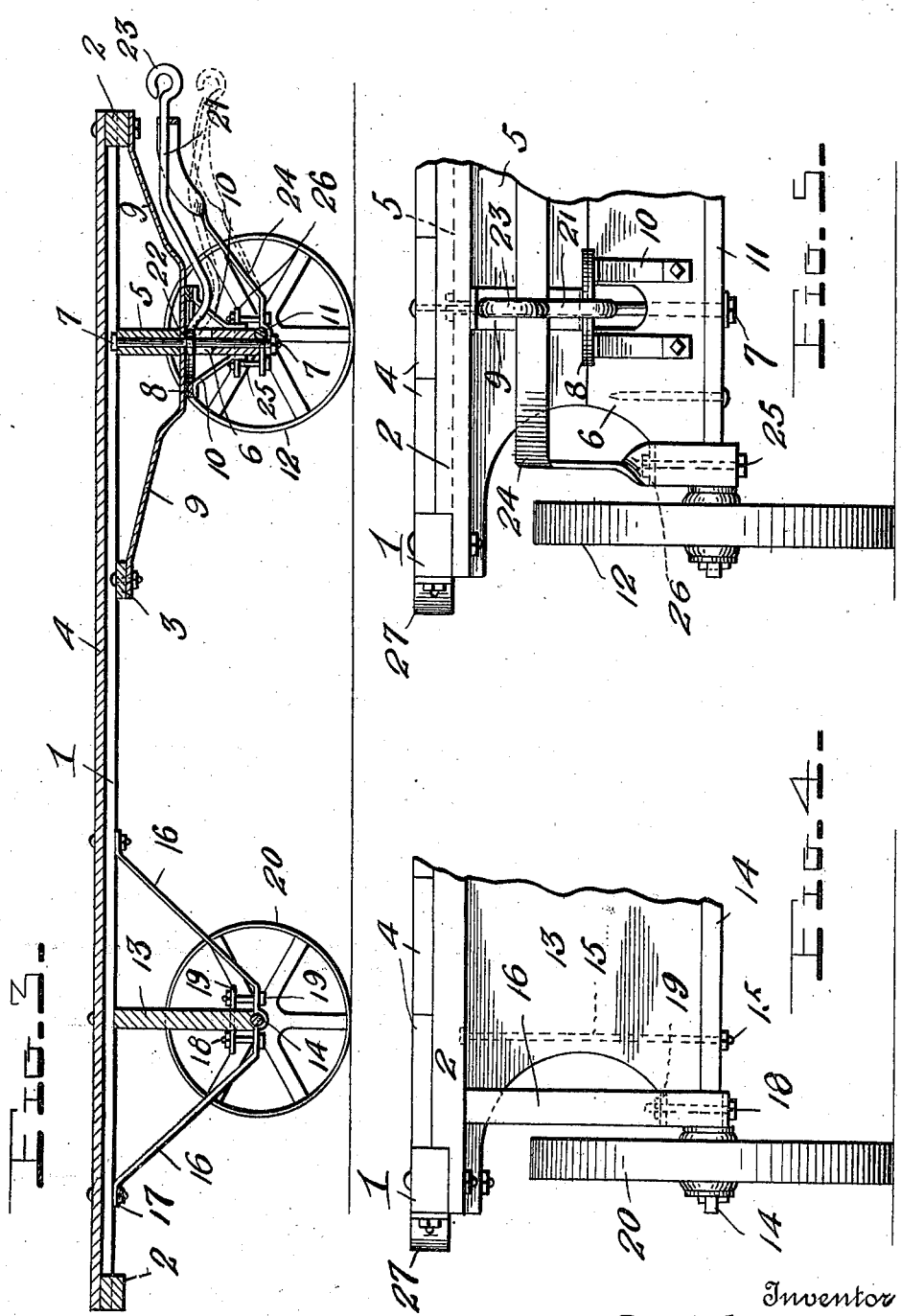

UNITED STATES PATENT OFFICE.

JAMES WILLIAM TAYLOR, OF GOLDSBORO, NORTH CAROLINA.

TRUCK.

977,759.  Specification of Letters Patent.  Patented Dec. 6, 1910.

Application filed September 21, 1909. Serial No. 518,832.

*To all whom it may concern:*

Be it known that I, JAMES WILLIAM TAYLOR, a citizen of the United States, residing at Goldsboro, in the county of Wayne and State of North Carolina, have invented certain new and useful Improvements in Trucks; and I do declare the following to be a full, clear, and exact description of the invention, such as will enable others skilled in the art to which it appertains to make and use the same.

This invention relates to improvements in trucks.

The object of the invention is to provide a truck which will be particularly adapted for the purpose of hauling tobacco, cotton, and corn, and the like, and which will be strong and durable in construction, and provided with an improved construction of draft device.

With this and other objects in view, the invention consists of certain novel features of construction, combination and arrangement of parts, as will be more fully described and particularly pointed out in the appended claims.

In the accompanying drawings: Figure 1, is a top plan view of a truck, constructed in accordance with the invention. Fig. 2, is a bottom plan view of the same. Fig. 3, is a central vertical longitudinal sectional view. Fig. 4 is a fragmentary rear end view, and Fig. 5 is a fragmentary front end view.

In the embodiment of the invention, I provide a main supporting frame, comprising longitudinal side bars 1, which are connected together at their opposite ends by end cross bars 2, and intermediate their ends by a cross bar 3. The ends of the cross bars 2 and 3 are notched to receive the side bars which are bolted or otherwise rigidly secured thereto. Fastened on the upper sides of the cross bars 2 and 3 are floor boards 4, the upper sides of which lie flush with the upper sides of the longitudinal side bars 1.

Secured to the under side of the side bars 1, adjacent to the front end of the truck, is a front bolster 5, which is pivotally connected to a front axle bed 6, by a king bolt 7, which extends through the bolster and bed, as shown.

Between the engaging inner edges of the bolster 5 and the axle bed 6, are the upper and lower members of a fifth wheel 8. The upper member of the wheel is braced by a forwardly and rearwardly projecting upwardly inclined brace bar 9, the forward end of which is secured to the front cross bar 2. The lower member of the fifth wheel is braced by front and rearwardly inclined brace bars 10, which are secured at their upper ends to the lower side of the lower section of the wheel, and at their lower end to the opposite sides of the front axle bed 6.

Bolted to the under side of the axle bed 6, immediately in front of the king bolt 7, is a front axle 11, on the opposite ends of which are mounted and secured in any suitable manner, front supporting wheels 12, of the truck.

Secured to the side bars 1, adjacent to the rear end of the truck is a rear axle bed or bolster 13, to the lower edge of which is bolted a rear axle 14, the fastening bolts 15, of which extend entirely through the bed 13, thus bracing and preventing the same from being split. The axle 14 and the bed 13 are further braced at each end by forwardly and rearwardly projecting upwardly inclined brace bars 16, the upper ends of which are bent outwardly at right-angles to the vertical, as shown at 17, and are bolted to the under sides of the side bars 1, as clearly shown in Fig. 2, of the drawings. The lower portions of the brace bars 16 are secured to the axle and the adjacent ends of the bed 13 by clip bolts 18, which are passed through the bars 16, and through clip plates 19, as shown. On the outer ends of the axle 14, are mounted and secured in any suitable manner, the rear supporting wheels 20 of the truck.

Arranged beneath the forward end of the truck, is a draw bar 21, on the inner end of which is formed an eye 22, which is loosely engaged with the king bolt 7 within the fifth wheel, and on the outer end of the draw bar 21, is formed a draft hook 23, with which is adapted to be connected any suitable draft devices for hitching the draft animals to the truck. The draw bar 21 is supported and braced by means of a brace bar 24, which is preferably bail shaped, and provided in its outer portion with an aperture through which the draft bar passes and which prevents the inner end of the draw-bar from slipping down on the king bolt. The inner ends of the brace bar 24 engage the under side of the front axle bed and are secured thereto by clip bolts 25, which are inserted therethrough and through clip plates 26, engaged with the lower portions of the front axle bolster, as shown. The brace bar 24 is preferably formed of spring metal and it will be noted that the side portions of the same are given a half twist so that the flat inner ends of said side portions impart a spring or yielding action to the brace to permit the draw bar to move up or down and thereby adjust itself to the pull or draft of the horse when ascending or descending grades in the road, as shown in dotted lines in Fig. 3 of the drawings. The longitudinal side bars 1, of the main frame of the truck are preferably provided along their edges with stake sockets 27, to receive the stakes for holding the material in place on the bottom of the truck.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new is:

1. In a truck, a main supporting frame, a front bolster secured to said frame, a front axle bed arranged beneath said bolster, a king bolt pivotally connecting said bolster and bed together, a fifth wheel arranged between said bed and bolster, a front axle secured to said axle bed, a draw bar loosely connected to said king bolt within said fifth wheel and a spring metal bail-shaped brace bar secured at its ends to the front axle and bolster and having formed in its central portion an aperture through which said draw bar passes, whereby the latter is adjustably supported in operative position.

2. In a truck, a main supporting frame, a front bolster secured thereto adjacent to the forward end of the truck, a front axle bed, a king bolt pivotally connecting said bolster and bed together, a front axle secured to the under side of said front axle bed, front supporting wheels mounted on the outer ends of said front axle, a fifth wheel arranged between said front bolster and axle bed and a brace bar secured to said fifth wheel and front bolster, said bar having forwardly and rearwardly extending upwardly inclined portions secured at their ends to the main frame of the truck.

In testimony whereof I have hereunto set my hand in presence of two subscribing witnesses.

JAMES WILLIAM TAYLOR.

Witnesses:
  JOHN SLAUGHTER,
  M. A. PEACOCK.